US00RE49843E

(19) United States
(12) Reissued Patent
Coresh

(10) Patent Number: US RE49,843 E
(45) Date of Reissued Patent: Feb. 20, 2024

(54) RECIPROCATING RAZOR ASSEMBLY WITH DIFFERENT AMPLITUDES OF MOTION

(71) Applicant: Leon Coresh, Tel Aviv (IL)

(72) Inventor: Leon Coresh, Tel Aviv (IL)

(21) Appl. No.: 17/706,040

(22) Filed: Mar. 28, 2022

Related U.S. Patent Documents

Reissue of:
(64) Patent No.: 11,167,437
Issued: Nov. 9, 2021
Appl. No.: 16/701,069
Filed: Dec. 2, 2019

(51) Int. Cl.
*B26B 21/40* (2006.01)
*B26B 21/38* (2006.01)
*B26B 21/52* (2006.01)
*B26B 21/22* (2006.01)

(52) U.S. Cl.
CPC ..... *B26B 21/4062* (2013.01); *B26B 21/38* (2013.01); *B26B 21/4012* (2013.01); *B26B 21/227* (2013.01); *B26B 21/405* (2013.01); *B26B 21/4068* (2013.01); *B26B 21/521* (2013.01); *B26B 21/526* (2013.01)

(58) Field of Classification Search
CPC . B26B 21/4062; B26B 21/38; B26B 21/4012; B26B 21/405; B26B 21/526; B26B 21/227; B26B 21/4068; B26B 21/521
See application file for complete search history.

(56) References Cited

U.S. PATENT DOCUMENTS 5,152,064 A 10/1992 Johnston
D343,922 S 2/1994 Ahlgren
5,307,564 A 5/1994 Schoenberg
5,504,997 A 4/1996 Lee
5,732,470 A 3/1998 Labarbara
5,794,342 A 8/1998 Davey
D423,143 S 4/2000 Cowell
6,125,857 A * 10/2000 Silber ..... B26B 21/00 132/215
6,161,288 A 12/2000 Andrews
6,418,623 B1 * 7/2002 Marcarelli ..... B26B 21/22 30/34.1
6,430,814 B1 8/2002 Solow
6,434,828 B1 8/2002 Andrews
6,442,840 B2 9/2002 Zucker
6,502,312 B2 1/2003 Beutel
6,615,492 B2 * 9/2003 Parsonage ..... B26B 19/10 30/43.91

(Continued)

FOREIGN PATENT DOCUMENTS

CA 2731538 1/2010
CA 2942900 9/2015

(Continued)

*Primary Examiner* — William C Doerrler
(74) *Attorney, Agent, or Firm* — Thomas Coester Intellectual Property

(57) ABSTRACT

A shaving razor having at least two independent blade assemblies coupled to substantially rigid linkages. The linkages each defining a pivot point between the two independent blade assemblies. A bridge spans between the linkages such that movement of the bridge causes pivoting about the pivot point enabling reciprocating motion of the blade assemblies where assemblies on opposite sides of the pivot point reciprocate in opposite directions.

20 Claims, 8 Drawing Sheets

(56) References Cited

U.S. PATENT DOCUMENTS

| | | | | |
|---|---|---|---|---|
| 7,024,776 | B2 | 4/2006 | Wain | |
| 7,086,160 | B2 * | 8/2006 | Coffin | B26B 21/4006 30/532 |
| 7,131,203 | B2 | 11/2006 | Wain | |
| 7,797,834 | B2 | 9/2010 | Steunenberg | |
| 8,024,863 | B2 | 9/2011 | Wain | |
| 8,156,652 | B2 * | 4/2012 | Takeuchi | B26B 19/048 30/43.2 |
| 8,273,205 | B2 * | 9/2012 | Murgida | B26B 21/225 156/242 |
| 8,479,398 | B2 | 7/2013 | Coresh | |
| 8,595,940 | B2 | 12/2013 | Coresh | |
| 8,671,576 | B1 * | 3/2014 | Hotella | B26B 21/4062 30/34.1 |
| 8,707,561 | B1 | 4/2014 | Kneier | |
| 8,726,517 | B2 | 5/2014 | Lau | |
| 9,144,914 | B2 | 9/2015 | Coresh | |
| 9,457,486 | B2 | 10/2016 | Coresh | |
| 10,112,313 | B2 | 10/2018 | Robertson | |
| 2005/0188540 | A1 | 9/2005 | Kelly | |
| 2006/0064875 | A1 | 3/2006 | Folio | |
| 2008/0034592 | A1 | 2/2008 | Smith et al. | |
| 2008/0148574 | A1 | 6/2008 | Chou | |
| 2012/0151772 | A1 | 6/2012 | Moon | |
| 2013/0000127 | A1 * | 1/2013 | Coresh | B26B 21/4012 30/41 |
| 2013/0160296 | A1 | 6/2013 | Park et al. | |
| 2013/0199346 | A1 * | 8/2013 | Psimadas | B26B 21/225 83/13 |
| 2014/0102271 | A1 | 4/2014 | Krenik | |
| 2014/0182138 | A1 | 7/2014 | Krenik | |
| 2014/0259676 | A1 | 9/2014 | Chou | |
| 2014/0259677 | A1 | 9/2014 | Coresh | |
| 2015/0266192 | A1 | 9/2015 | Coresh | |
| 2016/0001454 | A1 | 1/2016 | Coresh | |
| 2016/0089800 | A1 * | 3/2016 | Coresh | B26B 21/405 30/45 |
| 2016/0121496 | A1 | 5/2016 | Johnson | |
| 2016/0144519 | A1 * | 5/2016 | Hahn | B26B 21/225 30/50 |
| 2018/0304483 | A1 | 10/2018 | Lev | B26B 21/4012 |
| 2018/0361603 | A1 | 12/2018 | Griffin | |
| 2019/0337173 | A1 * | 11/2019 | Coresh | B26B 21/4012 |

FOREIGN PATENT DOCUMENTS

| | | | |
|---|---|---|---|
| GB | 184913 | A | 8/1922 |
| GB | 290796 | A | 5/1928 |
| GB | 2462086 | | 1/2010 |
| KR | 20140053107 | | 5/2014 |
| WO | 2010010517 | | 1/2010 |
| WO | 2013003484 | | 1/2013 |
| WO | 2015142526 | | 9/2015 |
| WO | 2016053664 | | 4/2016 |

* cited by examiner

KINEMATIC SCHEME

RECIPROCATING RAZOR ASSEMBLY WITH DIFFERENT AMPLITUDES OF MOTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Field

Embodiments of the invention relate to a shaving razor. More particularly, embodiments of the invention relate to a shaving razor having reciprocating blades.

Background

There are two main classes of shaving razors that dominate the market. There are electric razors, which have one or more cutting implements behind a screen or other protective barrier, where the cutting elements are powered to, for example, spin such that hair penetrating the screen or barrier is cut. The advantage of these types of razors is after the initial purchase, a large number of shaves are possible without replacing the device or parts thereof. Unfortunately, electric razors are typically somewhat bulky, making it difficult to get into tight spaces, for example, around a user's nose. Additionally, even in open spaces such as a user's cheek, the closeness of the shave generally does not match that which is possible with exposed-blade razors. This lack of closeness is due at least impart to the dimension of the barrier. Even relatively thin micro-screens have a thickness that dictates the maximum closeness of the shave. That is, the shave can be no closer than the thickness of the screen.

The second class of razors in common use today is exposed-blade razors, which have one or more blades arranged in a cartridge. A user pulls the cartridge across the area to be shaved, and the blades provide a shave that is generally closer than possible with an electric razor, owing to the fact that the blades are in direct contact with the user's skin and the dimension of the protective shield of the electric razors need not be accommodated. Commonly, three, four, or even five blades are aligned to cut in the same shaving direction. Even where multiple blades are present, the leading blade performs most of the cutting. As used herein, "leading" when modifying blade refers to the first blade to come in contact with the hair in the direction of shaving. As a result, the leading blade dulls more quickly than the other blades. Often, the dullness of the leading blade requires replacement of the cartridge while the remaining blades are perfectly serviceable.

Some razor manufacturers have come up with "power" models of their exposed blade razors. These razors include a battery in the handle and a motor with an eccentric mass such that when powered, the entire razor vibrates. In these models, the blades do not actually move; rather, the entire device vibrates. This feature has been heavily advertised, but market research reflects that it fails to provide any real benefit to the user, and the majority of users do not replace the battery once it goes dead. Studies have not revealed that power models have longer cartridge life or improved cutting efficacy over the unpowered models. Rather, these "power" exposed blade razors appear to be little more than a marketing gimmick.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration.

Figure 1:
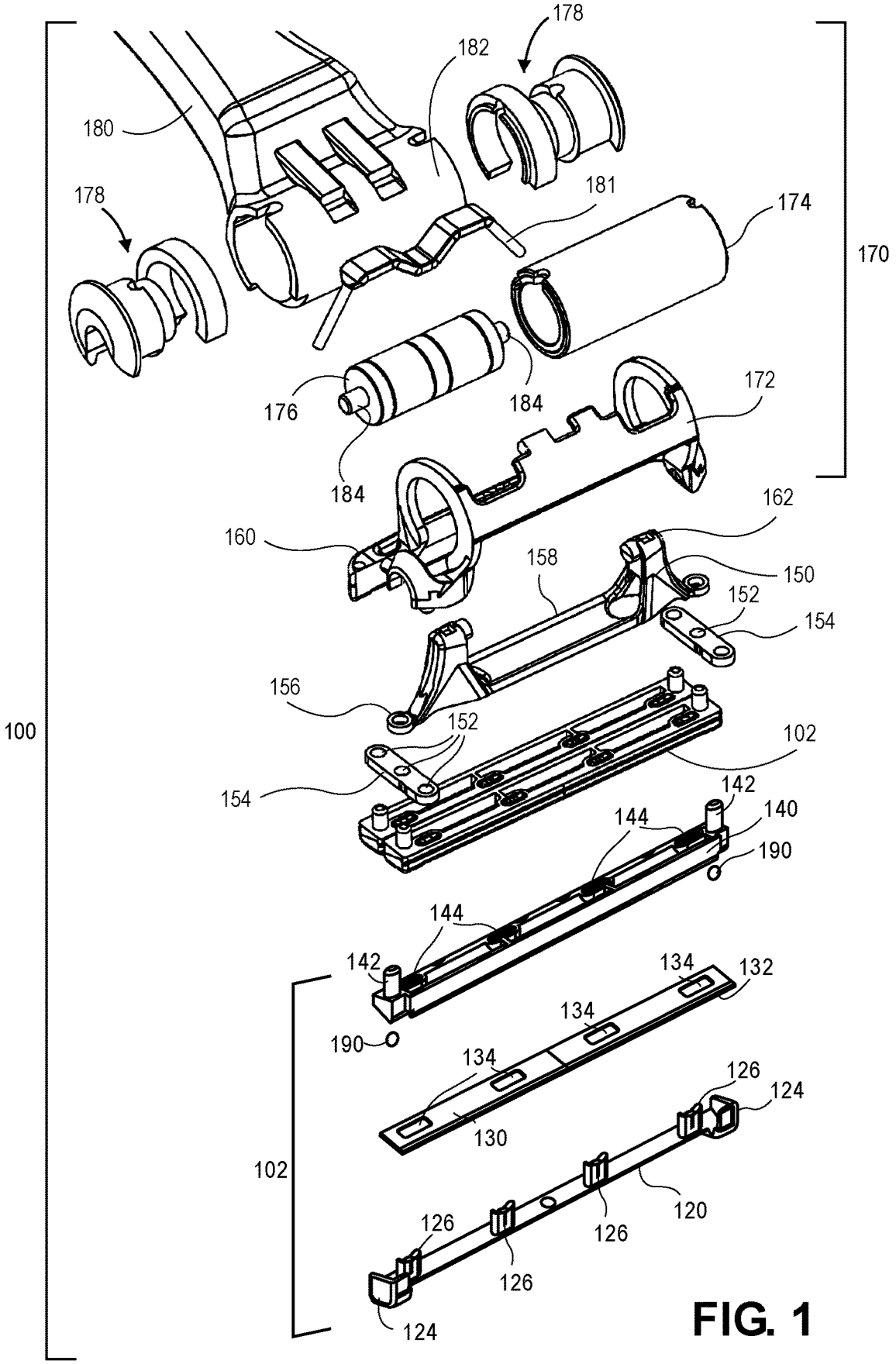
FIG. 1 is an exploded view of a shaving razor of one embodiment of the invention.

FIG. 1 is an exploded view of a shaving razor of one embodiment of the invention. Shaving razor 100 is made up of a handle 180, an actuator assembly 170, a bridge 150 and a plurality of blade assemblies 102 that couple to the bridge 150. While three blade assemblies 102 are shown, more or fewer blade assemblies 102 are within the scope and contemplation of embodiments of the invention. For example, two, four or five blade assemblies 102 could be used in various embodiments of the invention. Distal end 182 (the shaving end) of handle 180 is formed to receive actuator assembly 170. Actuator assembly 170 is used to drive and control reciprocation of the blade assemblies 102.

In one embodiment, actuator assembly 170 includes an armature housing 174, an armature 176, a pair of bushing containing end caps 178 and an actuator support 172. Armature 176 has dual shafts 184 and, in use, applies force to the bridge 150 to cause reciprocating motion of the blades as described more fully below. As it translates back and forth is applies a force on the bridge 150. In one embodiment the armature housing 174 and armature 176 uses a voice coil principle to move the shaft 184 back and forth in a reciprocating motion. In this context, by rapidly changing direction of the magnetic flux in the voice coil, the relative range of motion of the blade assemblies 102 can be precisely controlled. Armature 176 resides within armature housing 174. The armature housing 174 then resides within a void defined by distal end 182 of handle 180. Actuator support 172 is molded to engage distal end 182 and retain armature housing 174 within the void. Actuator support 172 may also be molded to include a leading platform 160 that extends from a front edge of the actuator support 172. Leading platform 160 resides ahead of the leading blade assembly and does not move responsive to force applied by the actuator assembly 170. As used herein, "leading" refers to earlier in position relative to the direction of shaving.

Bridge 150 is molded to have a yoke 158 that spans between two linkages 154 on to which blade assemblies 102 may be installed. The yoke 158 terminates in an eye at either end. The linkages 154 are substantially rigid such that they do not bend along the length of the linkage when driven by the actuator assembly 170. Linkages 154 are molded to define a plurality of bores 152. The number of bores 152 in each linkage 154 is dictated by the number of blade assemblies 102 desired to be part of the shaving head 100. Each blade assembly 102 includes a pair of posts 142 that pass through and remain rotatable within the bores 152 of the linkages 154. The importance of this rotatable engagement is detailed further below. Eyes 156 permit the bridge 150 to rotatably couple to the post 142 of one of the blade assemblies 102. Thus, the bridge 150 couples to the linkages 154 adjacent to at least one of the plurality of bores 152. In the shown embodiment, Eyes 156 couple the bridge to the linkages 154 adjacent to the center bore 152 of the three bores 152. In an alternative embodiment the eyes might couple the bridge adjacent to any one of the other bores 152. Bridge 150 is formed of a substantially rigid mechanical structure and may be molded of a material such as glass fiber impregnated plastic.

Bridge 150 also defines a handle attachment mechanism 162 that permits selective coupling of the razor head to handle 180 and in particular engagement of the yoke by the actuator assembly 170 and more specifically by actuator shaft 184. A release lever 181 is provided to cause the disengagement of the shaving head from the handle 180. While one possible handle arrangement is shown, other shapes and form factors are deemed to be within the scope and contemplation of different embodiments of the invention.

In one embodiment, blade assembly 102 has three primary parts, a razor blade 130, a cover 120 and a base 140. The cover 120 is unitarily molded as a single unit. The blade 130 has a cutting edge 132 and defines a plurality of voids 134. It is within the scope and contemplation of embodiments of the invention to use blades with more or fewer voids 134 than shown. If fewer or more pins are used fewer or more voids can be defined.

The cover 120 has formed as part thereof a plurality of deformable pins 126 that pass through the voids 134 of the blade 130. The cover 120 also has formed as part thereof end caps 124 at either longitudinal end of the cover 120. In one embodiment, the end caps 124 have a generally L shaped cross section. In one embodiment, the short leg of the L provides a hard stop that prevents forward movement of the blade 130 once installed over the pins 126. By holding the blade 130 against the hard stops during manufacture constant cutting edge location is achieved independent of inconsistences that may arise in the manufacture of the blade itself. For example, the relative distance between the cutting edge and the voids may be different between two blades owing to the fact that the edge is typically ground after the voids are punched. Precision molding of the hard stops permits significant tolerance in the blade production including both the edge and the voids without negatively impacting the precision of the finished assembly.

The base 140 is unitarily molded to define a plurality of voids 144 to receive pins 126. Base 140 may also optionally be molded to define one or more sacrificial electrode pockets to receive sacrificial electrodes 190. In one embodiment, the sacrificial electrodes 190 are aluminum spheres and the pockets are defined to be of a size that the sphere will pressure fit within the pocket. In one embodiment, the sphere has a diameter of 1 mm. Other shapes of sacrificial electrodes are also contemplated including but not limited to rectangular solids, toroids, discs and the like. Other embodiments may have the electrode pockets molded into the cover 120, but it is believed that ease of manufacture is enhanced with the electrodes 190 residing in the base 140. Molded as part of base 140 are a pair of deformable posts 142, which during assembly pass through the bores 152 of linkages 154.

To assemble blade assembly 102, the cover 120 is held in a fixture and the blade 130 is inserted such that the pins 126 pass through the voids 134 in the blade 130. The hard stops 124 in conjunction with the pins 126 force the blade into a precise position. The sacrificial electrodes 190 (if present in the embodiment) are pressure fit into pockets in the base 140 and the base 140 is overlaid on the cover-blade combination such that the pins 126 pass through the voids 144 in the base 140. Pressure is applied to pins 126 to drive them into the plastic range of the material used such that the pins 126 are permanently deformed and hold the assembly 102 together as a unit. Notably, unlike prior art razor assemblies that often relied on heat welding or similar processes, here, no heat processing is required for assembly. The final position of the blade is achieved when the sandwich of the cover, blade and base is compressed. The hard stops 124 ensure precision and consistency between blade assemblies. While the foregoing blade assemblies 102 are cost effective and efficient to manufacture, practice of embodiments of the invention are not limited to that particular construction or arrangement. Generally, any individual independent blade assemblies that can be installed on the linkages 154 could be used.

Figure 2:
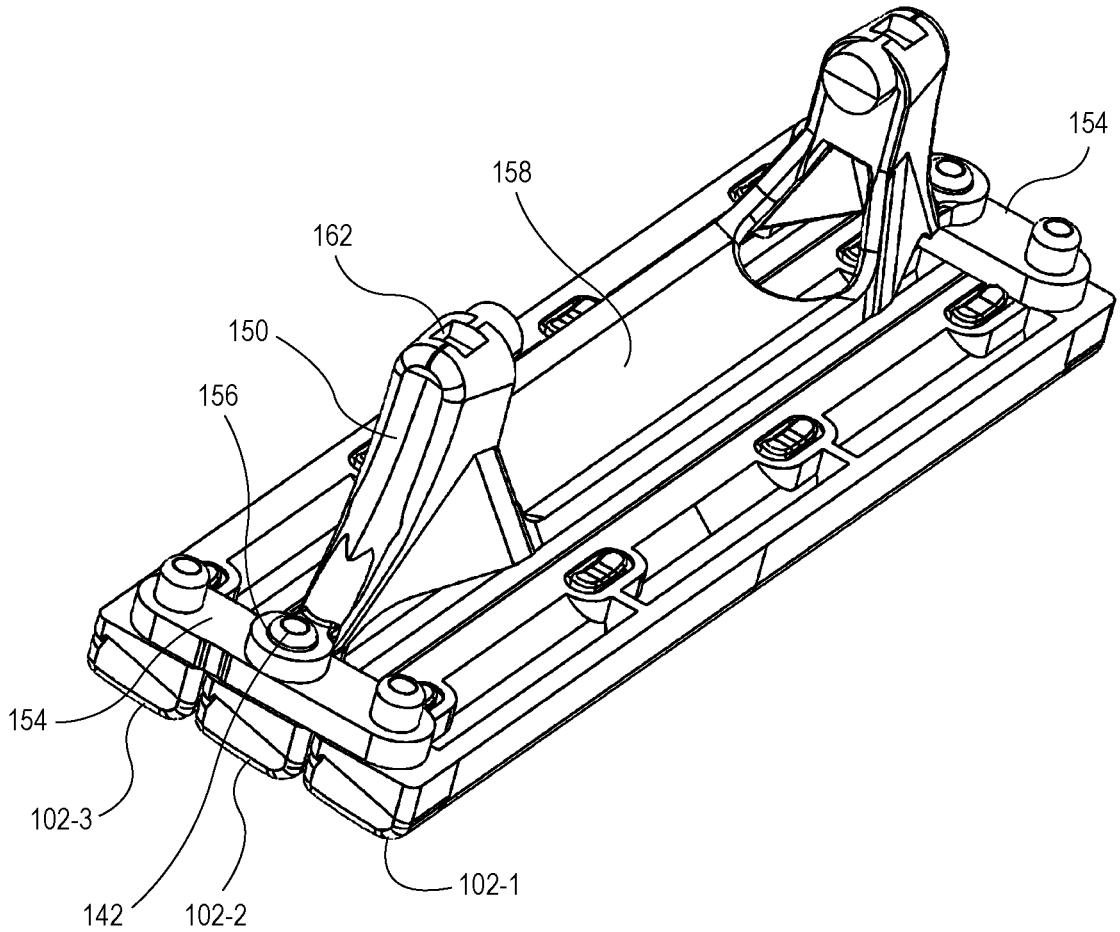
FIG. 2 is a rear view of the shaving head disconnected from the handle.

FIG. 2 is a rear view of the shaving head disconnected from the handle. In the shown embodiment, three independent blade assemblies 102-1, 102-2 and 102-3 are coupled to linkages 154. The linkages 154 are substantially rigid and couple to the bridge 150 via eye 156 that rotatably engages post 142. Thus, in the shown embodiment, the bridge 150 (which in use is driven by the actuator) attaches to the linkages 154 adjacent to center blade assembly 102-2.

Figure 3A:
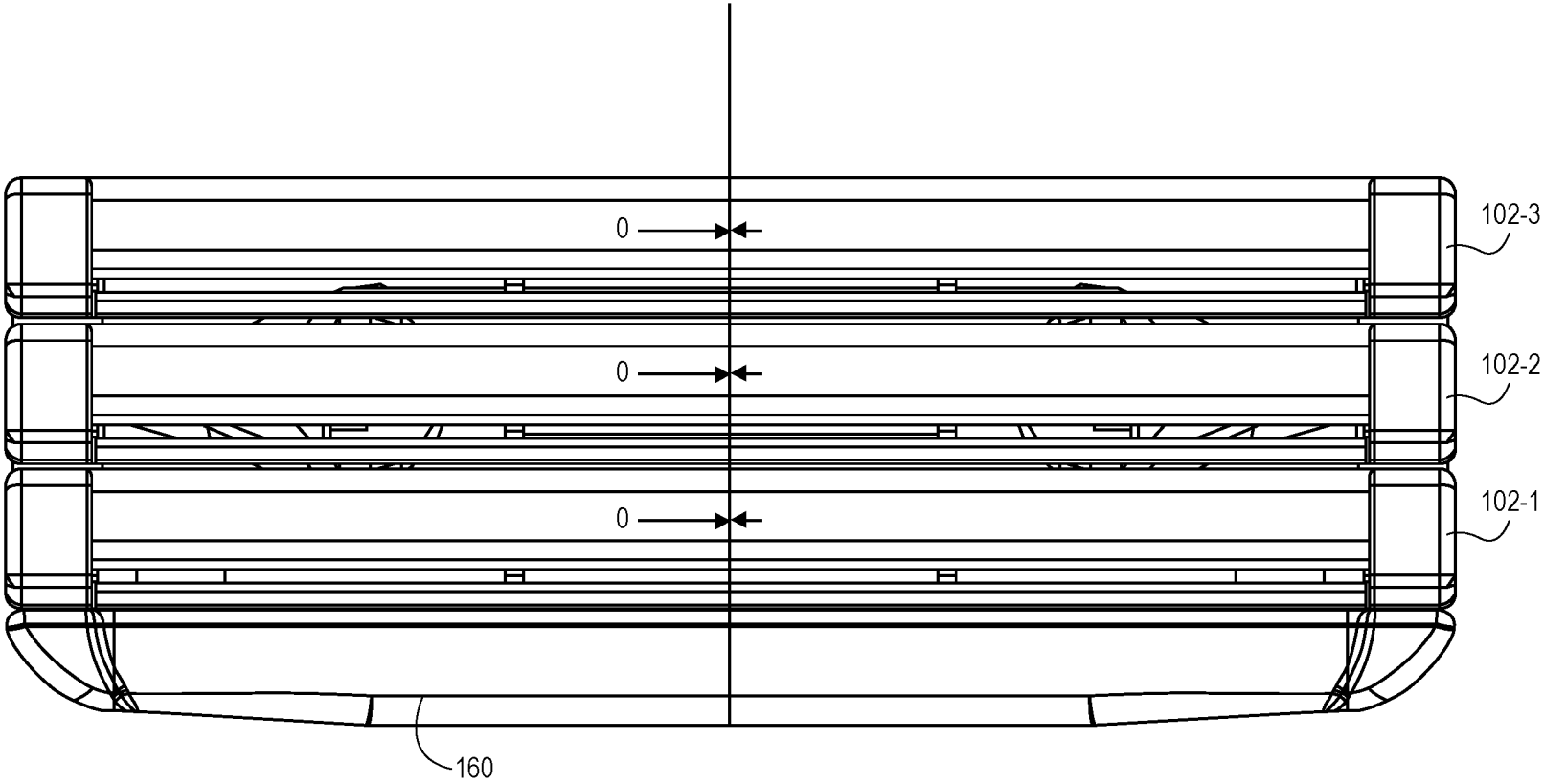
FIGS. 3A-3B show a plan view of the razor face of one embodiment of the invention with when no force is applied to the bridge and when the bridge is driven to the left respectively.
Figure 3B:
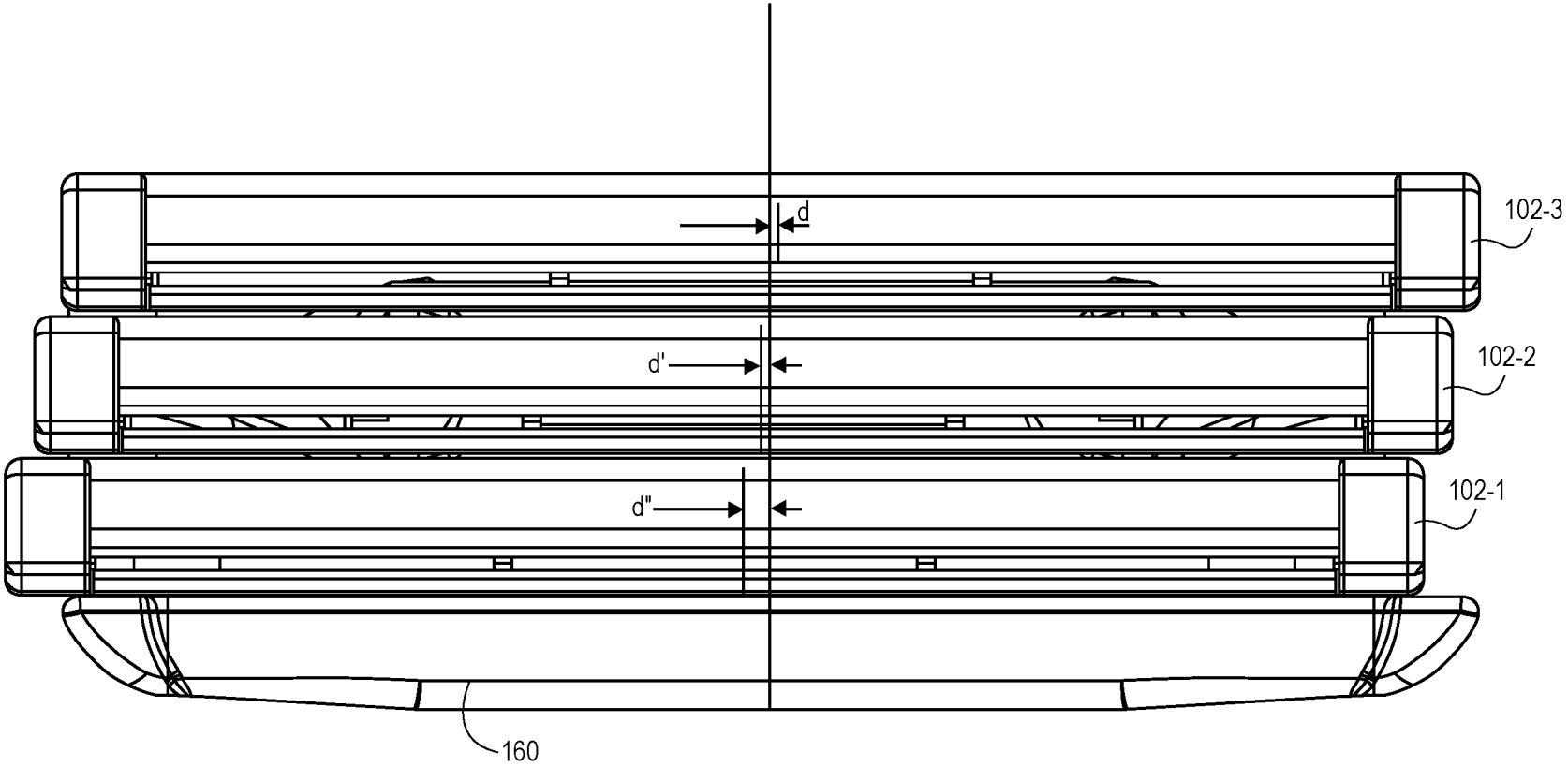

FIGS. 3A-3B show a plan view of the razor face of one embodiment of the invention with when no force is applied to the bridge and when the bridge is driven to the left respectively. In this embodiment, three identical blade assemblies 102-1, 102-2, 102-3 are coupled to bridge 150. As seen in FIG. 3A, when no force is applied the three blade assemblies 102-1, 102-2, 102-3 are all aligned with a common central axis also shared with the leading platform 160. Conversely as shown in FIG. 3B when the bridge is driven the maximum distance to the left assembly 102-3 is displace a distance d to the right of the common central axis, and assemblies 102-1 and 102-2 are driven a distance d" and d' respectively to the left from the common central axis. The mirror effect occurs when the bridge is driven to the right. In some embodiments, $d \neq d' \neq d''$. For example in one embodiment $d=0.08$ mm, $d'=0.10$ mm and $d''=0.28$ mm. In another embodiment $d=d' \neq d''$. For example $d=d'=0.10$ mm and $d''=0.20$ mm. As a general matter, the leading blade in a shaving razor performs the majority of the cutting. Accordingly, it is desirable for the leading blade to have the greatest range of motion as that large range improves the cutting efficiency. In some embodiments, the relative motion of the leading blade assembly to the lagging blade assembly is in the range from 0.1 mm to less than 0.5 mm and the relative motion of the middle blade assembly to the either other blade assembly is in the range of 0.05 mm to less than 0.25 mm.

While greater movement of the leading assembly has be found to be effective, it should be recognized that is not required. In some embodiments, for example, only two blade assemblies may be used with the pivot point centrally located between them such that each blade assembly experiences substantially equal movement. Other embodiments may have the pivot point located between the leading blade assembly and the middle blade assembly such that the lagging blade assembly experiences the greatest movement (presuming equal distance between the blade assemblies). In another embodiment the pivot point may be located at the middle blade assembly such that it effectively does not move and the leading and lagging blade assemblies reciprocate back and forth. Such an embodiment requires the bridge to apply its force displaced from the pivot point to cause the pivot.

Figure 4A:
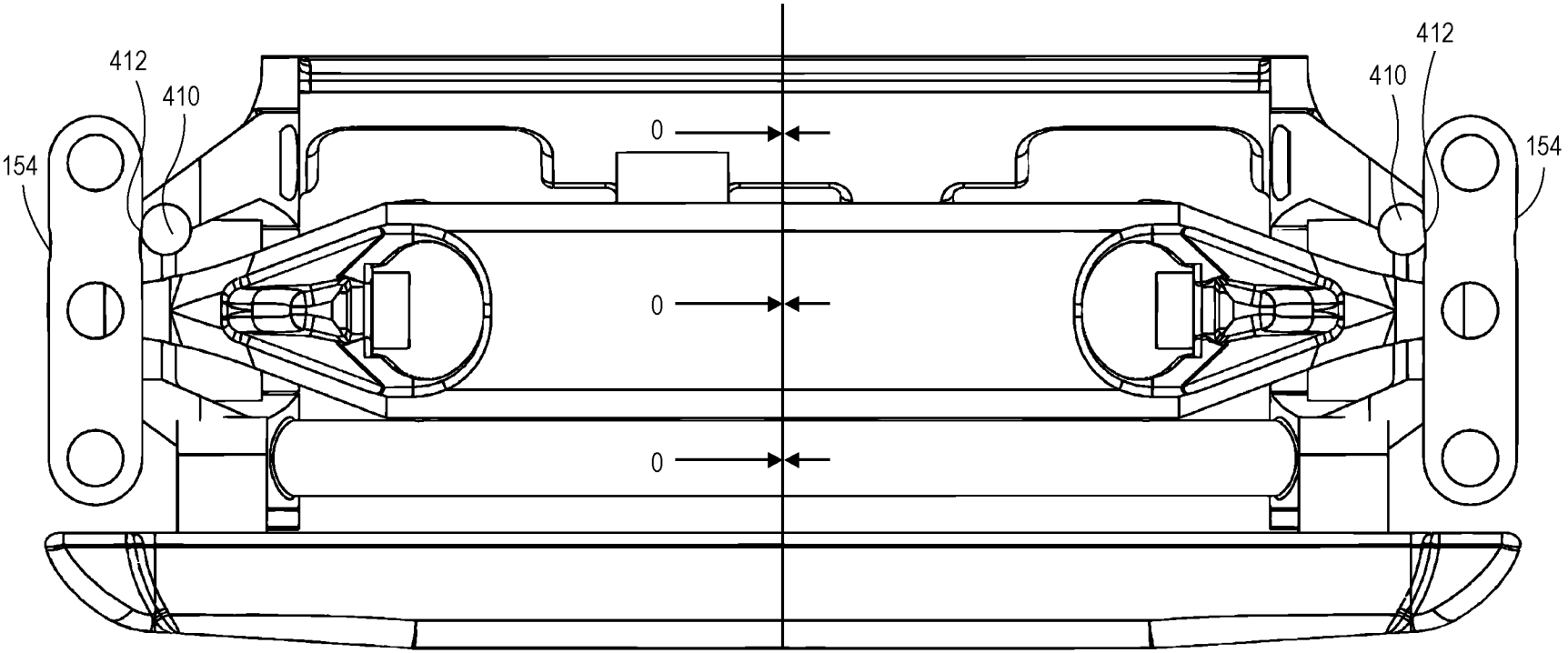
FIGS. 4A-4B show a rear plan view of the razor head in a undriven and driven configuration respectively.
Figure 4B:
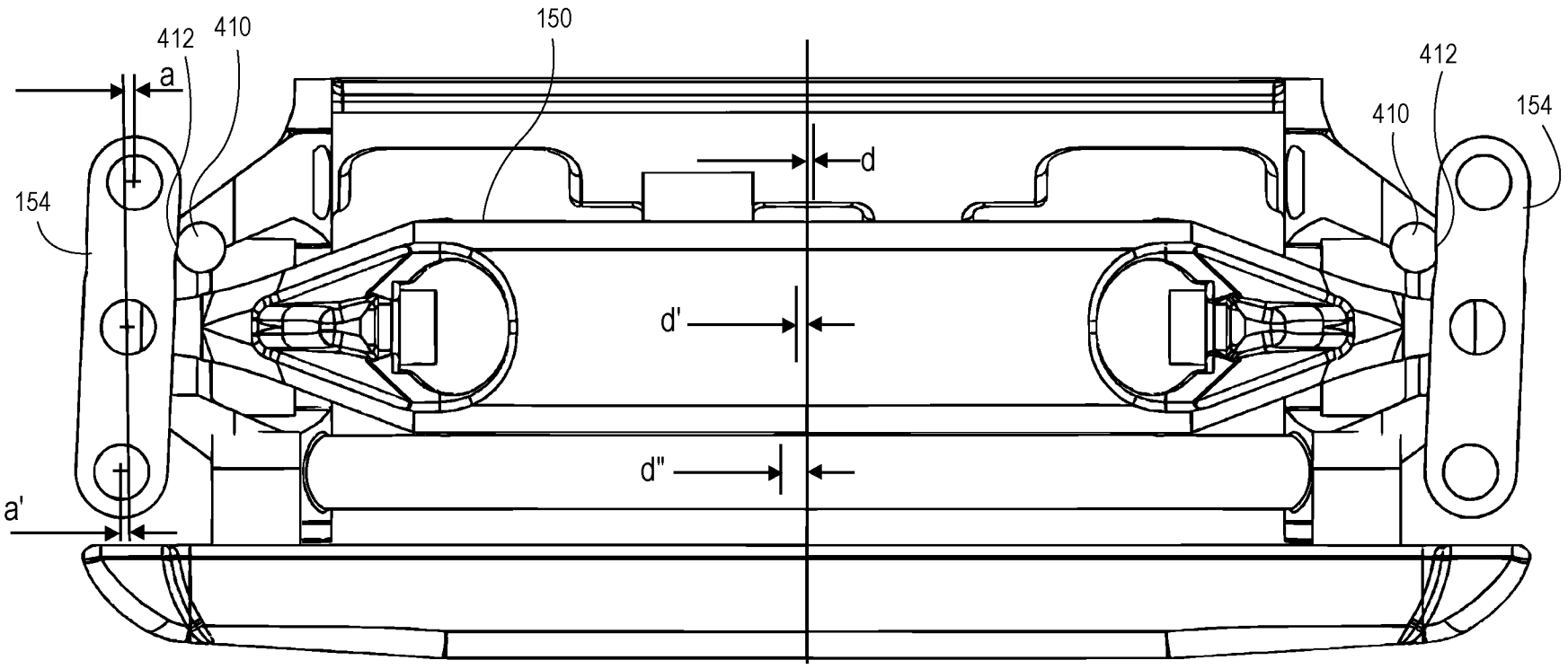

FIGS. 4A-4B show a rear plan view of the razor head in a undriven and driven configuration respectively. As revealed in FIG. 4A, the actuator support has molded as part thereof a pair of stops 410 that, in use, engage the linkages 154 each to define a pivot point 412 about which the linkages 154 pivot when driven by the actuator. In some embodiment the pivot point is defined simply by the abutment of the stop 410 against the linkage. In other embodiments, a cup, stop pocket or other stop retention feature is molded as part of the linkages 154. In FIG. 4A no force is applied, and the blade assemblies share a common central axis as in FIG. 3A.

In FIG. 4B, the bridge 150 is shown driven to the left. The pivot of the linkage 154 about the stop 410 at the pivot point 412 result in the displacements d to the right for the lagging blade assembly and a displacement of d' and d" to the left for the middle and leading blade assemblies respectively. The difference between the displacements d, d' and d" are a function of the distance between the pivot point 412 and the location to which the blade assembly is attached along the linkage 154. Thus, if two assemblies are equal distance from the pivot point the relative displacement in opposite directions will be equal. As the relative distance between the pivot point 412 and the attachment location of the blade assemblies increases, the amplitude of the displacement will increase. In this manner difference amplitudes of reciprocating motion can be created for different blade assemblies of a single shaving head with a single actuator.

The posts of the blade assemblies must rotate within the bores to permit the linkage to pivot as describe. In this embodiment d' is equal to the distance the bridge is driven in one direction. If one draws an axis through the center of the middle bore, the displacement of the center of the leading and lagging bores is a' and a respectively. Notably, while in the shown embodiment the distance between the middle bore and the other bores is the same, that need not be the case in all embodiment. Where the distance between the bore is different between the bore pairs, a and a' will generally not be the same. Furthermore, while the pivot point 412 in some embodiments is defined to be closer to the lagging attachment point (relative to the middle bore) other embodiments define the pivot point centrally between the middle and lagging bore or even closer to the middle bore.

Figure 4C:
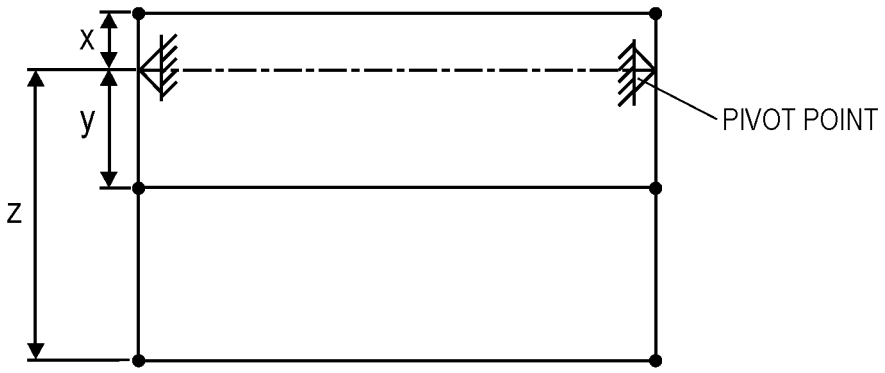
FIGS. 4C-4D show the kinematic scheme consistent with one embodiment of the invention.
Figure 4D:
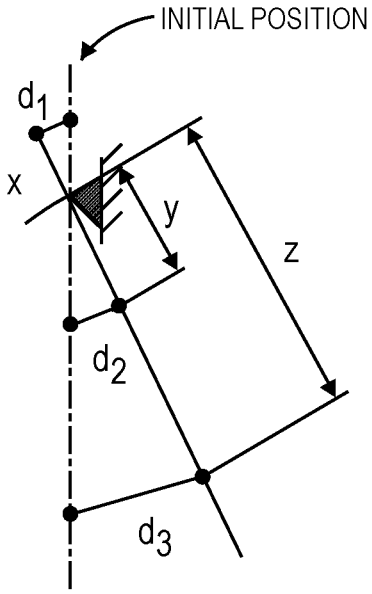

All of these geometric changes affect the relative range of reciprocating motion experiences by each blade assembly. FIGS. 4C and 4D show the kinematic scheme consistent with one embodiment of the invention. Shown schematically in FIG. 4C the razor head is in an initial position. The pivot points are shown. The distances between the pivot point and the lagging, middle, and leading blade assemblies are given by x, y, z respectively. FIG. 4D show the displacement of a linkage when the bridge is driven to the right. In this example, displacement from the initial position for the lagging, middle and leading balde assemblies are $d_1$, $d_2$ and $d_3$ respectively. Then, geometrically, $d_1/x=d_2/y=d_3/z$. Therefore, $d_1/d_2=x/y$ and $d_1/d_3=x/z$. While strictly the pivot of the rigid linkage causes arcuate movement of the blade assemblies, within the actual range of motion the movement of the blade assemblies is substantially linear. This is due to the fact that $d_1$, $d_2$ and $d_3$ are all <<the radius of the arc of rotation of the linkage.

Figure 5:
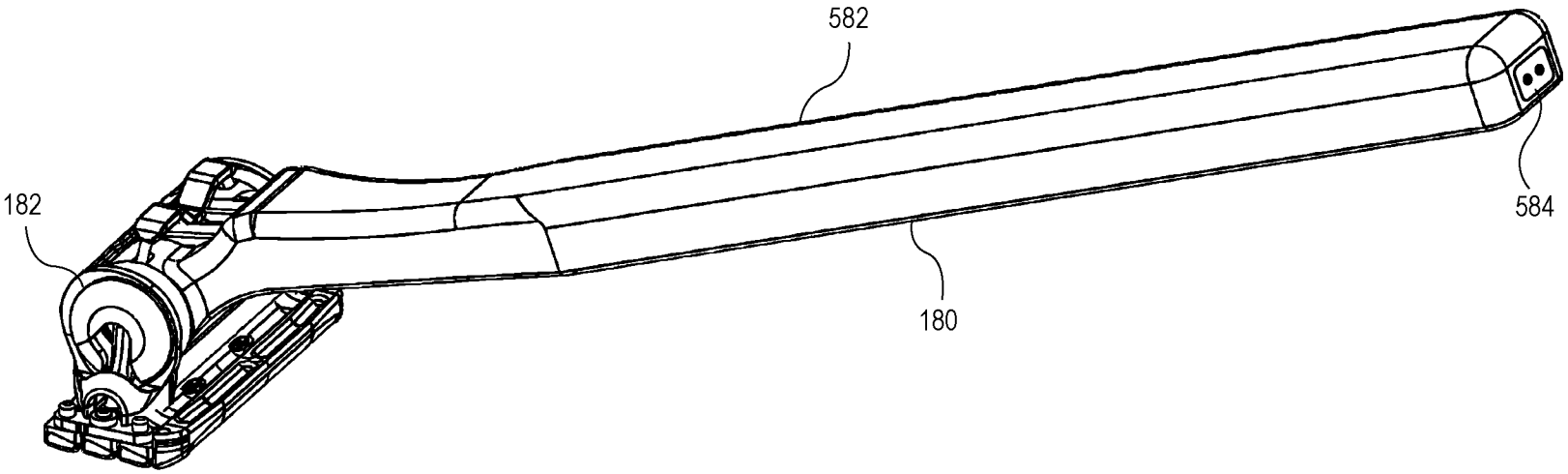
FIG. 5 is a view of the shaving assemble and handle of one embodiment of the invention.

FIG. 5 is a view of the shaving assembly and handle of one embodiment of the invention. Handle 180 has a shaft 582 that may contain power source such as a battery. In one embodiment, a single AAA battery is used. In other embodiments, a rechargeable battery, such as a lithium ion battery, may be employed. In a rechargeable embodiment, a power port 584 may be provided. In other embodiments, such as wet shave embodiments, the rechargeable battery may be induction charged without an explicit power port. The power source powers the actuator within distal end 182 of handle 180. The actuator then applies force to the shaving head as described above.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A shaving razor comprising:

at least two blade assemblies including a first independent blade assembly and a second independent blade assembly, each blade assembly having at least one blade;

a first and second substantially rigid linkages coupling together the first and second independent blade assemblies, the linkages each defining a pivot point between the first and the second independent blade assemblies;

a bridge spanning between and coupled the first and second linkages, wherein movement of the bridge causes the linkages to pivot about the pivot points such that the first and second blade assemblies move in opposite lateral directions responsive to a force applied by an actuator.

2. The shaving razor of claim 1 wherein an amplitude of lateral movement is greater for the second blade assembly than the first blade assembly.

3. The shaving razor of claim 1 wherein the first blade assembly is coupled to the linkages more proximate to the pivot points than the second blade assembly.

4. The shaving razor of claim 1 further comprising:

a handle; and the actuator residing within the handle to engage the bridge to cause motion of the bridge.

5. The shaving razor of claim 4 where in the actuator comprises:

an armature; and an armature housing.

6. The shaving razor of claim 1 further comprising:

a third independent blade assembly.

7. The shaving razor of claim 6 wherein a relative motion of the first blade assembly to the third blade assembly is in a range from 0.1 mm to [less than] 0.5 mm and a relative motion of the second blade assembly to the third blade assembly is in a range of 0.05 mm to [less than] 0.25 mm.

8. The shaving razor of claim 6 wherein a relative motion between the first blade assembly and the third blade assembly is less than 0.5 mm and the relative motion between the second blade assembly and the first blade assembly is no more than half the relative motion between the first and third blade assemblies.

9. The shaving razor of claim 1 wherein each linkage defines a plurality of bores, each bore to receive a post of one of the at least two, blade assemblies and wherein the post remains rotatable within the bore after assembly.

10. The shaving razor of claim 1 further comprising:

a pair of stops and wherein each linkage engages one of the pair of stops at the pivot point during use.

11. The shaving razor of claim 1 wherein each linkage defines a stop retention feature at the pivot point.

12. The shaving razor of claim 1 wherein an amplitude of the movement in a first lateral direction is substantially equal to an amplitude of the movement in a second lateral direction for each blade assembly.

13. The shaving razor of claim 1 wherein the relative motion between any two immediately adjacent blade assemblies is less than 0.5 mm.

*14. A shaving razor comprising:*

*a first blade assembly having a first razor blade with a first cutting edge, the first blade assembly displaceable along a first path substantially parallel to the first cutting edge:*

*a second blade assembly having a second razor blade with a second cutting edge, the second blade assembly deployed to cut in a same direction as the first blade assembly and to be displaceable along a second path substantially parallel to the second cutting edge:*

*a first linkage coupling together a first end of the first blade assembly with a first end of the second blade assembly: and*

*a second linkage coupling together a second end of the first blade assembly with a second end of the second blade assembly:*

*wherein the first and second linkages are configured such that a first displacement of the first blade assembly along the first path causes a second displacement of the second blade assembly along the second path, the second displacement being in the same direction as, but with a different amplitude from, the first displacement.*

*15. The shaving razor of claim 14 further comprising:*

*a first pivot element associated with the first linkage; and*

*a second pivot element associated with the second linkage,*

*wherein the first and second pivot elements defining pivot points for the first and second linkages, respectively.*

*16. The shaving razor of claim 14 further comprising: a third blade assembly having a third razor blade with a third cutting edge, the third blade assembly deployed for cutting in the same direction as the first and second blade assemblies and being displaceable along a third path substantially parallel to the third cutting edge: and*

*wherein a first end of the third blade assembly is coupled to the first linkage and a second end of the third blade assembly is coupled to the second linkage: and*

*wherein the first and second linkages are configured such that the displacement of the first blade assembly along the first path causes a displacement of the third blade assembly along the third path in a direction opposite to the displacement of the first blade assembly.*

*17. The shaving razor of claim 14 further comprising:*

*a handle: and*

*an actuator coupled to the handle to displace the first blade assembly.*

*18. The shaving razor of claim 17 wherein the actuator comprises a voice coil.*

*19. The shaving razor of claim 17 wherein an amplitude of relative motion generated by the actuator between the first blade assembly and the second blade assembly is in the range from 0.05 mm to 0.25 mm.*

*20. The shaving razor of claim 1 wherein the first and second blade assemblies reside aligned in a rest position when no force is applied and are, in use, displaced less than 0.25 mm in one direction from the rest position.*

* * * * *